United States Patent
Desai et al.

(10) Patent No.: US 9,778,820 B2
(45) Date of Patent: Oct. 3, 2017

(54) MANAGING APPLICATIONS ON A COMPUTING DEVICE

(71) Applicant: salesforce.com, inc., San Francisco, CA (US)

(72) Inventors: Sachin Desai, San Francisco, CA (US); Stephen Ayers, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 396 days.

(21) Appl. No.: 14/157,999

(22) Filed: Jan. 17, 2014

(65) Prior Publication Data

US 2014/0208266 A1 Jul. 24, 2014

Related U.S. Application Data

(60) Provisional application No. 61/754,417, filed on Jan. 18, 2013.

(51) Int. Cl.
*H04L 12/58* (2006.01)
*G06F 3/0482* (2013.01)
*G06Q 10/10* (2012.01)
*G06Q 50/00* (2012.01)

(52) U.S. Cl.
CPC .......... *G06F 3/0482* (2013.01); *G06Q 10/10* (2013.01); *G06Q 50/01* (2013.01)

(58) Field of Classification Search
CPC ....... G06F 3/0482; G06Q 10/10; G06Q 50/01
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

STIC Search Strategy Report (requested and received Jul. 19, 2017).*

(Continued)

*Primary Examiner* — Sharon Lynch
(74) *Attorney, Agent, or Firm* — Weaver Austin Villeneuve & Sampson LLP

(57) ABSTRACT

Disclosed are methods, apparatus, systems, and computer readable storage media for managing applications on a computing device. A computing device may receive allowed application data indicating applications that are launchable by a base application. A user interface with one or more selections of the applications may be displayed at a display of the computing device. The computing device may receive input data indicating a selection of an application. Identifier data associated with the base application and selection data associated with the application may be provided to the application.

15 Claims, 11 Drawing Sheets

(56) References Cited

U.S. PATENT DOCUMENTS

| | | | |
|---|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 * | 5/2004 | Brodersen ......... G06F 21/6227 |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,296,784 B1 * | 10/2012 | Brown .................... G06F 9/541 705/319 |
| 8,347,322 B1 * | 1/2013 | Brown .................... G06F 9/541 705/319 |
| 8,352,969 B2 * | 1/2013 | Brown .................... G06F 9/541 705/319 |
| 8,352,970 B2 * | 1/2013 | Brown .................... G06F 9/541 705/319 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,527,013 B2 * | 9/2013 | Guba ...................... G08G 1/20 455/41.2 |
| 8,566,301 B2 | 10/2013 | Rueben et al. |
| 8,646,103 B2 | 2/2014 | Jakobson et al. |
| 8,756,692 B2 * | 6/2014 | Williams ........... G06Q 30/0241 726/24 |
| 8,984,541 B1 * | 3/2015 | Brown .................... G06F 9/541 705/319 |
| 8,996,648 B2 * | 3/2015 | Archambault ........ H04L 12/588 709/203 |
| 9,098,165 B2 * | 8/2015 | Schoen ................. G06Q 10/10 |
| 9,098,545 B2 * | 8/2015 | Abhyanker ............ G06Q 10/10 |
| 9,117,249 B2 * | 8/2015 | Schacht ................ G06Q 50/01 |
| 9,123,080 B2 * | 9/2015 | Terleski ................ G06Q 50/01 |
| 9,195,705 B2 * | 11/2015 | Stout ..................... G06Q 50/01 |
| 9,253,196 B2 * | 2/2016 | Terleski ................ G06Q 50/01 |
| 9,256,674 B2 * | 2/2016 | Kao .................... G06F 17/3089 |
| 9,489,458 B1 * | 11/2016 | Haugen ............ G06F 17/30864 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |

(56) References Cited

U.S. PATENT DOCUMENTS

| | | | |
|---|---|---|---|
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0139075 A1* | 7/2004 | Brodersen | G06F 21/6227 |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2007/0043766 A1* | 2/2007 | Nicholas | H04L 67/02 |
| 2007/0130164 A1* | 6/2007 | Kembel | G06F 17/3089 |
| 2008/0040673 A1* | 2/2008 | Zuckerberg | G06F 17/30867 715/745 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0228486 A1* | 9/2009 | Kuehr-McLaren | G06F 17/3089 |
| 2010/0241579 A1* | 9/2010 | Bassett | G06Q 50/01 705/319 |
| 2011/0218958 A1 | 9/2011 | Warshavsky et al. | |
| 2011/0247051 A1 | 10/2011 | Bulumulla et al. | |
| 2011/0258692 A1* | 10/2011 | Morrison | G06F 21/53 726/11 |
| 2012/0011015 A1* | 1/2012 | Singh | G06Q 10/10 705/26.1 |
| 2012/0042218 A1 | 2/2012 | Cinarkaya et al. | |
| 2012/0096521 A1* | 4/2012 | Peddada | G06F 21/629 726/4 |
| 2012/0185486 A1* | 7/2012 | Voigt | H04L 51/32 707/741 |
| 2012/0233137 A1 | 9/2012 | Jakobson et al. | |
| 2012/0254902 A1* | 10/2012 | Brown | G06F 9/541 719/328 |
| 2012/0254903 A1* | 10/2012 | Brown | G06F 9/541 719/328 |
| 2012/0254904 A1* | 10/2012 | Brown | G06F 9/541 719/328 |
| 2012/0290407 A1 | 11/2012 | Hubbard et al. | |
| 2013/0124636 A1* | 5/2013 | Zuckerberg | G06F 17/30867 709/204 |
| 2013/0151613 A1* | 6/2013 | Dhawan | G06Q 10/10 709/204 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0238706 A1 | 9/2013 | Desai | |
| 2013/0247216 A1 | 9/2013 | Cinarkaya et al. | |
| 2014/0032672 A1* | 1/2014 | Yoshikawa | H04L 67/18 709/204 |
| 2014/0101250 A1* | 4/2014 | Dunn | H04L 65/403 709/204 |
| 2014/0156614 A1* | 6/2014 | Krappe | G06F 17/30082 707/694 |
| 2014/0208259 A1 | 7/2014 | Desai | |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |
| 2015/0334117 A1* | 11/2015 | Terleski | G06Q 50/01 726/27 |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

400

415

| | |
|---|---|
| Bill Smith 8:45 A.M. — We just passed $3 million in sales for the month! | |
| Xi Gaoli 10:05 A.M. — Just talked to our client, MegaCorp – make that $4 million for the month! | ★ |
| Edward Griffin 8:34 A.M. — We got a new client request from Pablo Delgado! | Star Corporation |
| Ling Montgomery 9:15 A.M. — I'm on it! | |
| Milton Adams 4:01 A.M. — Milton created a new opportunity: Asterisk Corporation Show More Info | |

405

Apps

410  420

☐ Linkedin

☐ Facebook

425

☐ Twitter

☐ Salesforce

*FIGURE 4A*

Xi Gaoli
10:05 A.M.
Just talked to our client, MegaCorp – make that $4 million for the month!

430a

Salesforce 1

LinkedIn

Edward Griffin
8:34 A.M.
We got a new client request from Pablo Delgado!

430b

Salesforce 1

LinkedIn

Facebook

Twitter

MANAGING APPLICATIONS ON A COMPUTING DEVICE

PRIORITY DATA

This patent document claims priority to and commonly assigned U.S. Provisional Patent Application No. 61/754,417, titled "System and Method for an App Eco-System Providing App Discoverability and Launching Capability", by S. Desai, et al., filed on Jan. 18, 2013, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to the use of applications on a computing device, and more specifically, to managing, identifying, and launching such applications.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods and computer readable media for managing applications on a computing device. These drawings in no way limit any changes in form and detail that may be made by one skilled in the art without departing from the spirit and scope of the disclosed implementations.

FIGS. 4A, 4B, and 4C show an example of a graphical user interface (GUI) 400 for a base application managing an application ecosystem according to some implementations.

DETAILED DESCRIPTION

Figure 1:
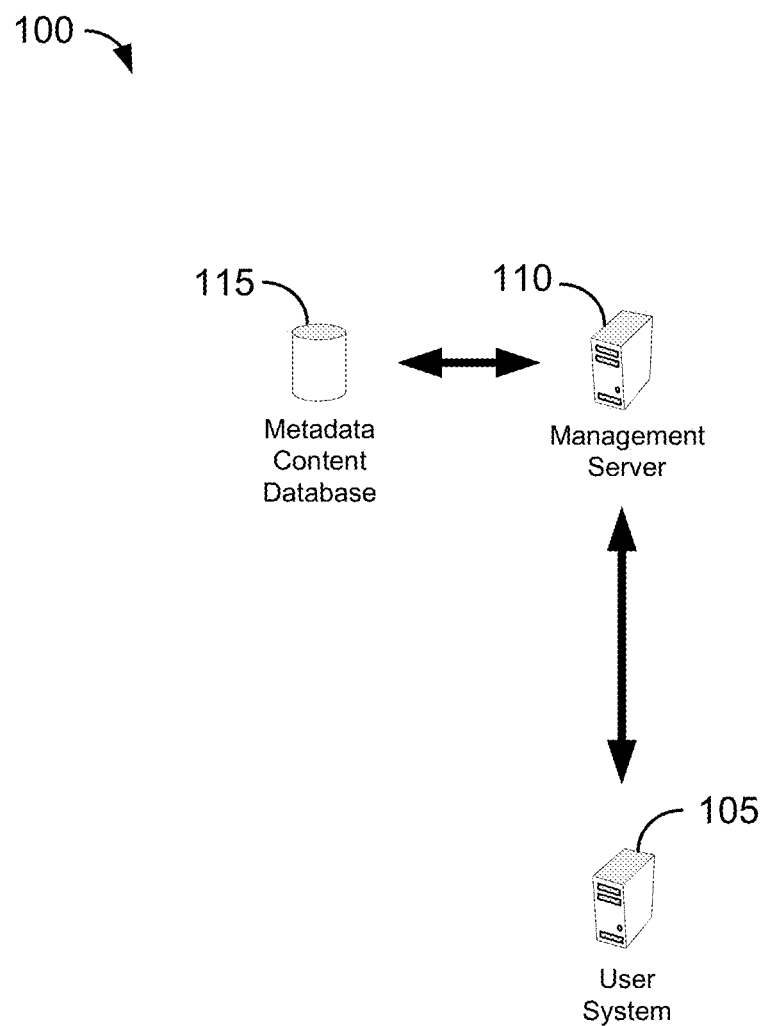
FIG. 1 shows a system diagram of an example of architectural components 100 for managing, identifying, and launching applications in an application ecosystem according to some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different systems, apparatus, methods, and computer-readable storage media for managing, identifying, and launching applications in an application ecosystem. A computing device may receive data providing an indication as to allowable applications on the computing device. For example, the data may be provided by an organization's server. In this way, the applications on the computing device of the organization may be managed. Additionally, the users of the device (e.g., members of the organization) may be provided with new applications of interest to the user and the organization.

As an example, a computing device may provide user data to an application management server. The server may determine the applications to be provided to the computing device. The server may provide different members of the organization different applications. The computing device may receive the allowed applications from the server, and therefore, configure a base application as a starting point for launching the allowed applications. Some applications may run solely on the computing device. Other applications may include a program installed on the user device, but also communicate with another server associated with the program. Accordingly, different types of applications may be accessed by a base application in the computing system. As such, new applications may be easily identified and provided.

In some instances, applications may be provided to the computing device based on a role of the user in the organization and/or based on the geographic region of the user.

For example, a base application provided by Star Corporation, an insurance company, may be provided on a tablet. The base application may be configured to launch a particular set of allowed applications. In particular, when a Star Corporation employee launches the base application, the application management server may be contacted. The management server can determine that the base application is allowed to launch, for example, a Department of Motor Vehicles (DMV) application and a Facebook application (i.e., an application that may communicate with a server associated with the Facebook social network). The list of allowed applications that the base application is allowed to launch (i.e., the DMV application and the Facebook application) may be provided by the management server to the tablet.

The base application may then be configured to provide access to the DMV application and the Facebook application. For example, links and/or buttons for launching the DMV application and the Facebook application may be provided on a GUI of the base application. Accordingly, the DMV application may be launched (e.g., by selecting a link) to search the DMV records of a client, for example, John Smith. In the DMV application, a link may provide access to the Facebook application to search for a profile of John Smith on the social network. For example, the DMV application may include information on John Smith's traffic ticket history as well as provide a link to John Smith's Facebook profile. The Facebook application may be launched from the DMV application because the Facebook application was identified by the management server as an application that may be launched from the base application.

The base application, the DMV application, and the Facebook application may all use an application programming interface (API) to communicate and provide data to each other. For example, when the base application launches the DMV application, identifier information associated with the base application may be passed to the DMV application. The identifier information may be used by the DMV application to return to the base application. Additionally, data for performing an action may also be provided by the base application. As an example, if the DMV application is selected, the name "John Smith" may be provided to the DMV application to search for John Smith's DMV records. If the Facebook application is selected from the DMV application, data provided by the base application to the DMV application may also be passed to the Facebook application. For example, the identifier information for the base application may also be provided so that the Facebook application may return to the base application without returning to the DMV application.

Additionally, because the Facebook application is passed the identifier information for the base application by the DMV application, the Facebook application may also pass data to the base application. For example, data from John Smith's profile, such as his birthday, may be provided by the Facebook application directly to the base application. The base application may include a social media feed with a variety of comments from employees of Star Corporation. The data provided by the Facebook application (e.g., John Smith's birthday) may be posted in a comment on the social media feed. Accordingly, applications may be launched from application-to-application to provide data back to the base application.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

Online social networks are increasingly becoming a common way to facilitate communication among people who can be recognized as users of a social networking system. Some online social networks can be implemented in various settings, including organizations, e.g., enterprises such as companies or business partnerships, academic institutions, or groups within such an organization.

In some online social networks, users can access one or more social network feeds, which include information updates presented as items or entries in the feed. Such a feed item can include a single information update or a collection of individual information updates. A feed item can include various types of data including character-based data, audio data, image data and/or video data. For example, a post related to an online marketing campaign may appear as a feed item. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

FIG. 1 shows a system diagram illustrating an example of architectural components 100 for managing, identifying, and launching applications in an application ecosystem according to some implementations. Architectural components 100 in FIG. 1 may provide communications to be transmitted among a variety of different hardware and/or software components. For example, architectural components 100 may include user system 105, management server 110, and metadata content database 115.

In some implementations, management server 110 may receive requests from user system 105, analyze the requests, obtain data in metadata content database 115, and provide the data to user system 105. User system 105 may obtain the data and configure a software application based on the data received from management server 110.

Accordingly, various components are able to communicate with each other over the Internet or a combination of networks including the Internet. For example, in an implementation, management server 110 may transmit data to and process data received from user system 105. Management server 100 may also store data received from user system 105 into a database, such as metadata content database 115, or another database. Moreover, management server 110 may obtain data from metadata content database 115 in response to processing data obtained from user system 105.

As an example, user system 105 may include a base application installed which may communicate with management server 110. The base application on user system 105 may provide management server 110 a variety of data, for example a user identifier (e.g., a username, name, or other identifier associating user system 105 with a member of an organization), applications installed on user system 105, version numbers or identifications of the applications installed, etc. Accordingly, user system 105 may provide data to management server 110. Management server 110 may analyze the data. For example, the data may identify user system 105 as being associated with a member of an organization. Metadata content database 115 may include data indicating the applications that may be installed on user system 105 as a member of the organization. Accordingly, management server 110 may provide the data from metadata content database 115 to user system 105. That is, management server 110 may provide user system 105 with data associated with allowed applications that may be launched on user system 105.

As another example, user system 105 may be used by an employee of "MegaCorp." User system 105 may contact management server 110, which may be a server administered by MegaCorp, for applications that may be launched by user system 105, for example, via a base application used by MegaCorp's employees. The MegaCorp base application may include a social media feed where MegaCorp's employees may post comments regarding activities of the company, such as sales or marketing. The MegaCorp base application may also be configured to provide a list of applications that may be launched. Accordingly, when user system 105 contacts management server 110, management server 110 may determine that the base application may be allowed to launch a sales application exclusive to employees of MegaCorp and a Linkedin application (i.e., an application associated with the Linkedin social network). The base application may receive data indicating that the sales application and Linkedin application may be launched from the base application, and therefore, configure a GUI to display that the applications may be launched.

User system 105 may be any type of computing device. For example, user system 105 may be a smartphone, a laptop, a tablet, a wearable display device, and a desktop computer, or other electronic device. User system 105 may also be part of a vehicle, a consumer appliance, a sensor, a robot, or any other electronic product.

Additionally, management server 110 and user system 105 may be managed by the same or different entities. In one example, management server 110 may be associated with an organization. User system 105 may be associated with a user or member of the organization.

Figure 2:
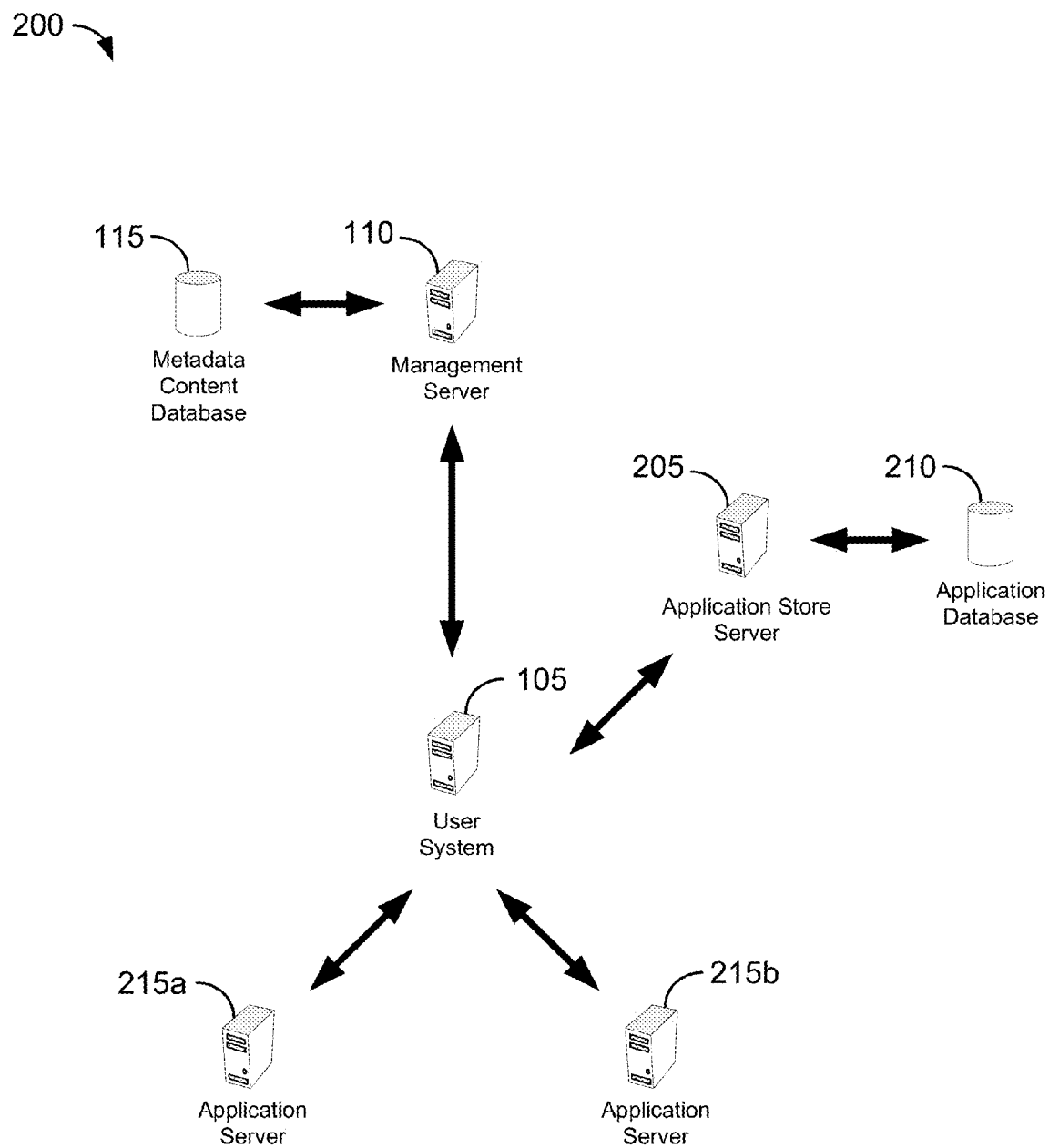
FIG. 2 shows another system diagram of an example of architectural components 200 for managing, identifying, and launching applications in an application ecosystem according to some implementations.

FIG. 2 shows another system diagram of an example of architectural components 200 for managing, identifying, and launching applications in an application ecosystem according to some implementations. Architectural components 200 may also provide communications to be transmitted among a variety of different hardware and/or software components. For example, architectural components 200 may include the same components as architectural components 100 as well as application store 205, application database 210, application server 215*a*, and application server 215*b*. Accordingly, in FIG. 2, management server 110 may obtain data from and provide data to user system 105.

In an implementation, a base application may be used to launch additional applications. In FIG. 2, a base application configured or installed in the operating system of user system 105 may contact management server 110 to determine the additional applications that may be initiated or launched by the operating system or base application in user system 105. In some implementations, user system 105 may provide credentials associated with a user to management server 110. The credentials, such as a username or other identifier, may be used by management server 110 to determine the applications that may be allowed to be launched from the base application on user system 105. For example, a user may be identified as a member of an organization. The organization may be identified with a social networking application and a marketing application in metadata content database 115. Accordingly, management server 110 may determine that the organization is associated with the social networking application and the marketing application, and therefore, provide user system 105 with data indicating that the social networking application and the marketing application are able to be installed or used in user system 105. In an implementation, no credentials may be provided. The computing device may be configured to connect and obtain the same data as another computing device from management server 110.

In an implementation, if both the social networking application and the marketing application are already installed on user system 105, both applications may communicate with additional servers. For example, in FIG. 2, social networking application may communicate with application server 215*a*, which may be a server associated with the social networking application. Accordingly, application server 215*a* may also obtain and provide data for user system 105. Likewise, the marketing application may communicate with the same or another server. For example, in FIG. 2, the marketing application may also communicate with application server 215*a*. In other implementations, the marketing application may communicate with another application server, such as application server 215*b* in FIG. 2.

In some implementations, user system 105 may communicate with application store server 205. Application store server 205 may communicate with application database 210 and provide applications to user system 105. For example, as previously discussed, management server 110 may provide user system 105 data indicating that the social networking application and marketing application may be enabled on user system 105. In some implementations, the applications may already be installed, and therefore, are enabled. However, in other implementations, the applications may not be installed. That is, management server 110 provides data that the applications may be installed and enabled, and therefore, installation of the applications may be possible by obtaining the appropriate application data from application store server 205 for installation at user system 105. Accordingly, after obtaining the applications from application store server 205, the applications may be launched or executed by user system 105.

As an example, user system 105 may be used by an employee of "MegaCorp," and therefore, may receive data indicating that the base application may launch a sales application and a Linkedin application based on being associated with MegaCorp. Accordingly, the base application may be configured to allow the sales application and Linkedin application to launch. The sales application may contact another server, such as application server 215*a*, to access data when launched. The Linkedin application may contact another server, such as application server 215*b*, when launched.

If an application is allowed to be launched, but not installed, application store server 205 may be contacted to obtain installation files from application database 210. For example, management server 110 may indicate that the Linkedin application may be launched. If the Linkedin application is not installed, application store server 205 may be contacted for the Linkedin application installation files.

Figure 3:
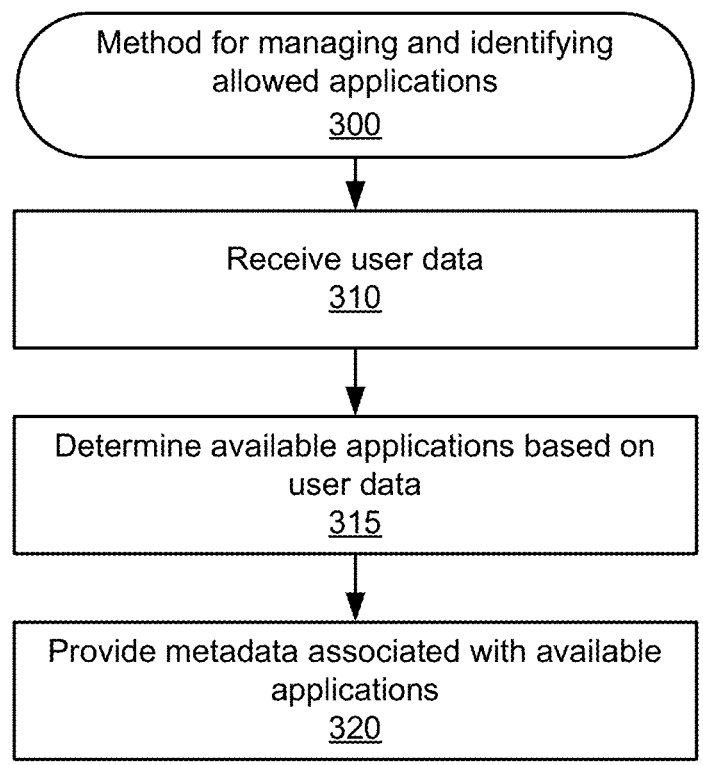
FIG. 3 shows a flowchart of an example of a computer implemented method 300 for managing and identifying applications in accordance with some implementations.

FIG. 3 shows a flowchart of an example of a computer implemented method 300 for managing and identifying applications in accordance with some implementations. In block 310, user data may be received by a server. That is, user system 105 may provide data to management server 110. For example, user system 105 may provide user data may including information such as a username, real name, position, organization, geographic region, or other information that may be used by management server 110 to determine the data in metadata content database 115 that may be provided to user system 105. Accordingly, in block 315, available applications based on the user data may be determined. For example, if user data indicating an organization is received, the organization may be associated with one or more applications.

As an example, the organization may be "Asterisk Corp," a company selling computer hardware, and may be associated with a computer sales application and an application associated with "Computer Aficionado," a purchasing application for the computer industry. As such, in block 320, metadata associated with the one or more applications may be provided, and therefore, a computing device may receive an indication as to the applications that may be launched on the computing device. For example, the computer sales application and the Computer Aficionado application may indicated as applications that may be launched. The data may include application names, version identifiers (e.g., a version number), a URL or other identifier that may be used in a scheme to uniquely identify the application in application store server 205 and/or application database 210. In some implementations, actions and contextual data for the actions may also be provided. For example, the computer sales application may be associated with actions such as "View Record" and "Edit Record." In an example, the Computer Aficionado application may be associated with actions such as "Search." The search action associated with the Computer Aficionado application may contact a server and search an auction database for computer hardware. The contextual data for the search action may include a keyword, such as "computer mouse." Accordingly, the Computer Aficionado application may be launched to search the auction database for a computer mouse.

In some implementations, different users in the same organization may be provided different lists of applications allowed to be launched on the computing device by the base application. For example, an organization may include one sales representative in the United States and a second sales representative in China. Accordingly, a different set of allowed applications may be associated with the different geographic regions. For example, for a social networking website, the United States sales representative may be allowed to launch a Facebook application. However, instead of Facebook, the China sales representative may be allowed to launch a RenRen application. As such, the relevant applications may be identified based on the geographic region.

In other implementations, allowed applications may be based on a position in an organization. For example, certain groups may be associated with different sets of allowed applications. Engineers may be associated with an engineering application. However, sales representatives may be associated with a sales application. Accordingly, the organization may restrict users associated with an engineering group to the engineering application and not have access to the sales application. Likewise, the organization may restrict users associated with a sales group to the sales application and not have access to the engineering application on the computing device. In some implementations, the allowed applications for engineers and sales representatives may overlap. That is, the two classes of positions may include some allowed applications in common.

In another implementation, roles based on permissions may be used to identify application. As an example, users at different levels of an organizational hierarchy may be provided different lists of allowed applications. Users at a manager level may be associated with a first set of allowed applications. Users at a senior manager level may be associated with a second set of allowed applications with some applications being different between the first set of allowed applications and the second set of allowed applications. As another example, engineers underneath a manager may be associated with a set of applications. The manager above the engineers in the organizational hierarchy may be associated with another set of applications. In some implementations, the users at a higher level of the organizational hierarchy may be associated with applications that include all the applications available to members of the organization at a lower level of the organizational hierarchy. For example, a manager may be associated with allowed applications that include every allowed application for engineers at the lower level of the organizational hierarchy, as well as additional applications not available to the engineers at the lower level of the hierarchy.

In some implementations, allowed applications may include applications associated with partners of the organization. For example, the corporation SALESFORCE.COM may partner with another corporation such as an independent software vendor (ISV), and therefore, the ISV's applications may be indicated as an allowed application that may be identified and launched from a base application provided by SALESFORCE.COM. In an implementation, the names of ISVs of the organization may be provided to the base application. The base application may then query application store server 205 for the applications uploaded by the ISVs. The applications may then be provided as allowed applications based on configurations made by administrators of the SALESFORCE organization. As such, data may be provided by management server 110 and the allowed applications may be provided by application store server 205 based on data provided from user system 105.

In addition to a set of allowed applications, functionalities associated with the allowed applications may also be provided. For example, an allowed application may be associated with actions such as viewing a sales record, editing a sales record, and deleting a sales record. Accordingly, the computing device may use the allowed application and view, edit, and delete a sales record associated with a database on a server. In other implementations, various functionalities of an application may be different from user to user. For example, an Information Technology (IT) administrator may be indicated as being allowed to install and/or launch a sales application with the functionalities including viewing, editing, and deleting sales records. However, another user, such as a sales representative, may be indicated as being allowed to install and/or launch the same sales application as the IT administrator, but restricted to functionalities including viewing and editing sales records. That is, the sales representative may not have permission to access the deleting functionality of the sales application that the IT administrator has permission to use.

Figure 4B:
Figure 4B:
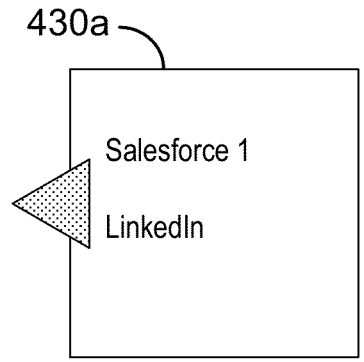
Figure 4C:
Figure 4C:
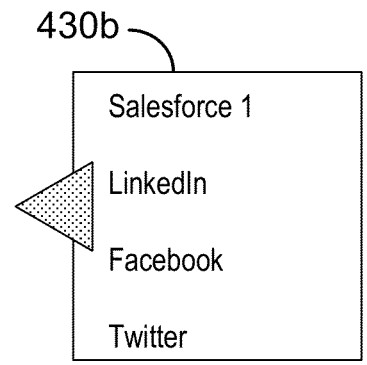

FIGS. 4A, 4B, and 4C show an example of a graphical user interface (GUI) 400 for a base application managing an application ecosystem according to some implementations.

In FIG. 4A, GUI 400 may be a base application installed on a computing device. GUI 400 may provide social media feed 405, allowed applications 410, and corporation data

415. Social media feed 405 may include content and discussions associated with an organization. Allowed applications 410 may include applications that user system 105 has received as applications that may be launched on user system 105. Corporate data 415 may include additional data associated with an organization. For example, in FIG. 4A, the base application may be an application provided by "Star Corporation" and include a logo of the corporation. The content in social media feed 405 may include actions, discussions, and other details associated with the organization (i.e., Star Corporation) and its members. For example, social media feed 405 includes comments such as "We just passed $3 million in sales for the month!" from an employee of the organization.

In an implementation, applications may be marked as installed or uninstalled. For example, in FIG. 4A, marker 420 associated with Linkedin may be associated with an installed application that is allowed to be run on user system 105. That is, Linkedin has been indicated as an allowed application and is installed. Likewise, the Salesforce application in allowed applications 410 is also indicated as installed. However, in FIG. 4A, marker 425 associated with Twitter may be associated with an application is an allowed application but is not installed on user system 105. That is, Twitter has been indicated as an allowed application, but is not installed. Accordingly, a user may be alerted to an application that is permitted to be launched, but is not currently installed. Additionally, new applications providing new functionality may be visible to a user as an uninstalled application.

Accordingly, the base application may show the allowed applications. That is, a GUI of the base application may be configured to display, for example, links for launching the allowed applications. As such, an organization can allow its users or members to identify new applications authorized to be launched from the base application. Additionally, applications may be managed from a server. For example, when the base application connects (e.g., when it is initialized or started) with a server (e.g., management server 110), the allowed applications may change, with new applications added and old applications removed. Accordingly, if an application was previously enabled, the base application may obtain new data indicating that the application is no longer an allowed application, and therefore, disable the application and remove it from the list in allowed applications 410. For example, management server 110 may provide data indicating that a particular application is no longer allowed. As another example, management server 110 may provide all the allowed applications and the base application may determine that a previously allowed application is no longer in the list of allowed applications indicated by management server 110, and therefore, may remove the application from the allowed applications. Moreover, if an application is no longer allowed and another application is allowed, the application that is no longer allowed may not be launched from the allowed application.

In some implementations, the allowed applications that are installed are also provided to management server 110 and may be stored in metadata content database 115 or another database. As such, the organization may keep track of the number of users who are using a particular application. For example, in FIG. 4A, a Facebook application (i.e., an application that may access a server associated with the Facebook social network) is an allowed application that is not installed. If Facebook is selected, and installed based on data from application store server 205, data may be provided to management server 110 that Facebook has been installed on a user account associated with the user who just installed Facebook. In some implementations, data may be provided to management server 110 when the application is installed, and in other implementations data may be provided to management server 110 when the base application is launched. Management server 110 may keep track of the number of installations of each application. Additionally, when an allowed application is launched, usage data may be provided to management server 110 indicating that the application has been launched, and therefore, the organization may keep track of the most frequently launched or executed applications.

In FIG. 4A, the order of applications in allowed applications 410 may also be determined by management server 110. In an implementation, newly allowed applications may be selected to be prioritized over older applications, and therefore, may be positioned to the top of the list. In another implementation, the most used or the least used applications may be positioned at the top of the list. For example, data indicating an application is installed may be provided to management server 110. Accordingly, management server 110 may have access to data indicating how many users in an organization have installed a particular application, and therefore, may provide data to user system 105 on how to prioritize the allowed applications based on the usage data. For example, the applications installed by the most users may be at the top of the list. Alternatively, the applications installed by the least users may be at the top of the list. Additionally, applications may be ordered based on frequency of use throughout the organization. For example, the applications that are launched the most within the organization may be prioritized (e.g., at the top of the list of allowed applications). As such, the order of allowed applications in allowed applications 410 in the base application may be ordered based on the usage data of applications within the organization.

FIG. 4B shows an example of a graphical user interface (GUI) 400 for a base application managing an application ecosystem according to some implementations. In FIG. 4B, a message posted on a feed in social media feed 405 is shown. In particular, in FIG. 4B, a comment (i.e., "Just talked to our client, MegaCorp,—make that a $4 million month!") associated with a client "MegaCorp" has been posted and viewable in the base application. A corporation like MegaCorp may be associated with actions or functionalities associated with a variety of allowed applications as specified by management server 110. In FIG. 4B, applications 430a (e.g., SALESFORCE1® and Linkedin) may be allowed applications that can perform an action associated with MegaCorp. For example, SALESFORCE1® may provide access to a customer record associated with MegaCorp and Linkedin may search for a Linkedin profile associated with MegaCorp. Accordingly, different actions from different allowed applications may be associated with a variety of posts or comments in social media feed 405 and access to the allowed applications provided in GUI 400 via applications 430a. In an implementation, the base application may associate allowed applications and/or actions of allowed applications to the feed items.

FIG. 4C shows another example of a graphical user interface (GUI) 400 for a base application managing an application ecosystem according to some implementations. In FIG. 4C, a message posted on a feed in social media feed 405 is shown. In particular, in FIG. 4C, a comment associated with a prospective client "Pablo Delgado" is shown. Applications 430b may show different allowed applications than applications 430a because different types of actions may be performed with the prospective client "Pablo Delgado" than the existing client "MegaCorp." For example, in FIG. 4C, the SALESFORCE1® application may provide access to a customer record associated with "Pablo Delgado" and the Linkedin application may search for a profile associated with "Pablo Delgado." However, in FIG. 4C, applications 430b also include Facebook and Twitter, which may search for accounts on the respective social media networks associated with "Pablo Delgado."

Accordingly, different allowed applications may be associated with actions corresponding to different comments in social media feed 405.

Figure 5:
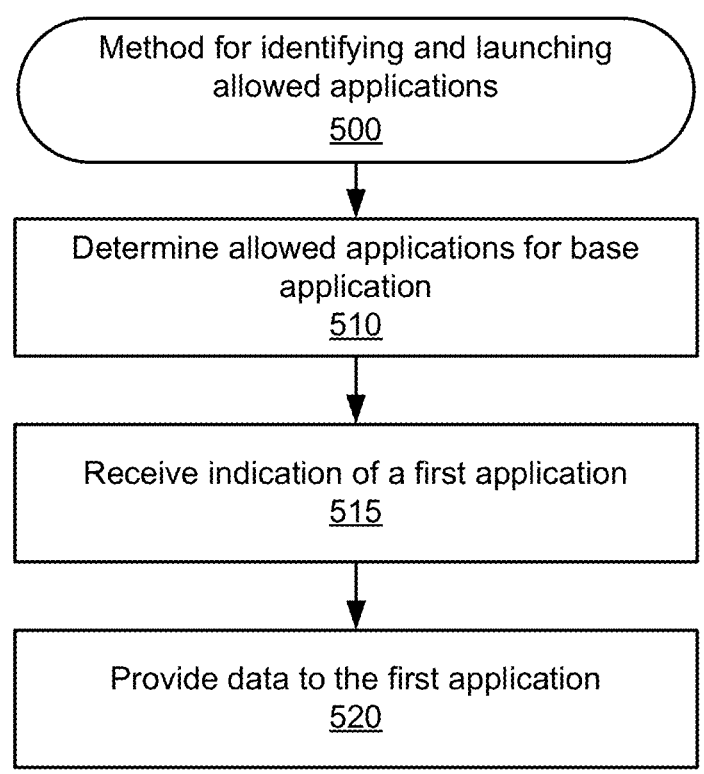
FIG. 5 shows a flowchart of an example of a computer implemented method 500 for identifying and launching applications according to some implementations.

FIG. 5 shows a flowchart of an example of a computer implemented method 500 for identifying and launching allowed applications according to some implementations.

In FIG. 5, at block 510, the allowed applications that may be launched from the base application may be determined. The base application may receive data from management server 100 indicating the allowable applications that may be launched from the base application. For example, the base application may be associated with a city government and the allowed applications may include a city government application and an email application. Accordingly, the base application may receive the data indicating which applications are allowed, and provide a selection of applications that are allowable, such as via allowable applications 410 of GUI 400 in FIG. 4A.

At block 515, an indication of a first application may be received. For example, an allowed application may be selected (e.g., via a link in allowed applications 410 of GUI 400), and therefore, launched by the base application. If the application is not already installed, application store server 205 may be contacted to obtain the installation files for the application. In an implementation, management server 110 may provide a link or identifier for an allowed application to be found in application store server 205. Accordingly, a computing device may use the link or identifier to obtain the installation files for the allowed application from application store server 205. For example, management server 110 may provide a URL of the allowed application at application store server 205.

At block 520, data may be provided to the first application. In some implementations, an action associated with the selected allowed application may be provided to the application, as well as contextual data associated with the action and data associated with an identifier for the base application. For example, if a comment on "Pablo Delgado" is posted in a social media feed as in FIGS. 4A and 4C, Linkedin may be an available application. Accordingly, the Linkedin application may be passed an action, such as search for a profile. Additionally, contextual data such as "Pablo Delgado" may be passed to the application. Accordingly, the base application may launch the Linkedin application to perform the particular action based on the contextual data "Pablo Delgado." That is, a search for a profile belonging to "Pablo Delgado" may be performed on Linkedin. Data associated with an identifier for the base application may also be passed. As such, the base application may pass the aforementioned data and allow another application to be launched based on the data provided by the base application. Accordingly, the allowed application may perform an action based on information provided by the base application. Moreover, the base application may provide an identifier associated with itself to the allowed application such that when the allowed application is closed or finished executing the action, the allowed application may return to the base application. In some implementations, an application may perform a single action, or an application launched from the base application may perform a single action, and therefore, an action may not be provided. For example, a CNN News application may include a single action to view a news feed, and therefore, may perform a single action and not need an action to be specified. In an implementation, data from the executed allowed application may be passed back to the base application as well.

As an example, base application may employ a scheme to launch other applications. In one example, a scheme such as "AppName://action?contextdata=alpha" may be used where AppName may be an identifier for an application (e.g., the name of an allowed application or base application), action may be an action the application is intended to run, and contextdata may be the contextual data (i.e., "alpha") for running the action.

Figure 6:
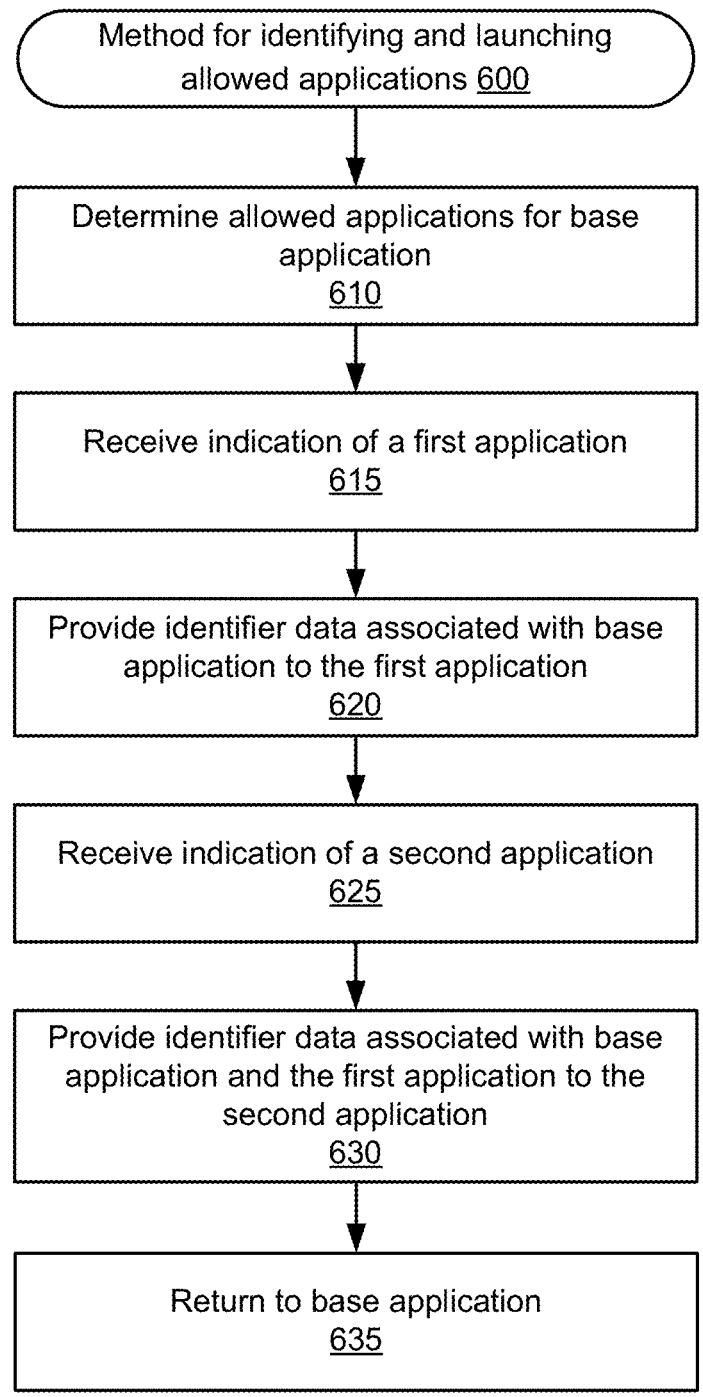
FIG. 6 shows a flowchart of an example of a computer implemented method 600 for identifying and launching applications in accordance with some implementations.

FIG. 6 shows a flowchart of an example of a computer implemented method 600 for identifying and launching applications in accordance with some implementations.

In FIG. 6, at block 610, the allowed applications may be provided to a computing device, and therefore, a base application may be configured to provide a list of the allowed applications. In block 615, an indication of a selection of a first application may be received. For example, an application may be selected from the base application. The indication may be associated with a particular action meant for the first application to perform. The application may be passed an action indicating that a server associated with the application (e.g., application server 215a) may be searched based on contextual data provided by the base application, for example, from a social media feed. For example, the application may be a Linkedin application. The action may be "search" and the contextual data may be a name, such as "Sumit Aggarwal." That is, the Linkedin application is to search for a profile belonging to Sumit Aggarwal. Additionally, in block 620, data associated with the base application may be provided. For example, an identifier associated with the base application may be provided to the allowed application, and therefore, the application may be able to return to the base application after finishing the action, closing the application, or receiving a selection indicating returning to the base application from the allowed application (e.g., via a home or back button).

At block 625, an indication of a second application may be received. In some implementations, the indication may be a request to launch another application from the previously launched application.

At block 630, data associated with the base application may also be passed from the first application to the second application. That is, the identifier information received from the base application may be passed from the first application to the second application. Additionally, new contextual data and/or actions for the second application may be passed from the first application to the second application. In some implementations, identifier information, contextual data, and/or actions associated with the first application may also be provided to the second application.

At block 635, the computing device may return to the base application from the second application. That is, since the base application identifier data was provided from the base application to the first application and subsequently passed from the first application to the second application, the base application may be transitioned to. For example, a home button may be provided such that when the second application is launched and the home button is pressed, the identifier for the base application may be obtained, and therefore, the base application may be returned to and the second application may be closed or sent to the background.

In another implementation, a back button may be provided such that the computing device may transition from the second application to the first application. For example, when the computing device switches from the first application to the second application, identifier information and other data (e.g., actions, contextual data, etc.) of the first application may be provided to the second application and used to return to the first application from the second application.

Additionally, identifier information associated with all applications, including the base application, launched up to the launching of the latest application may also be provided. As such, a history of applications may be browsed and any previous application may be returned to by using the identifier information. Moreover, any actions or contextual data associated with any of the previous applications may also be passed to the latest application and the data may be used to return to a prior application at its prior state.

Figure 7:
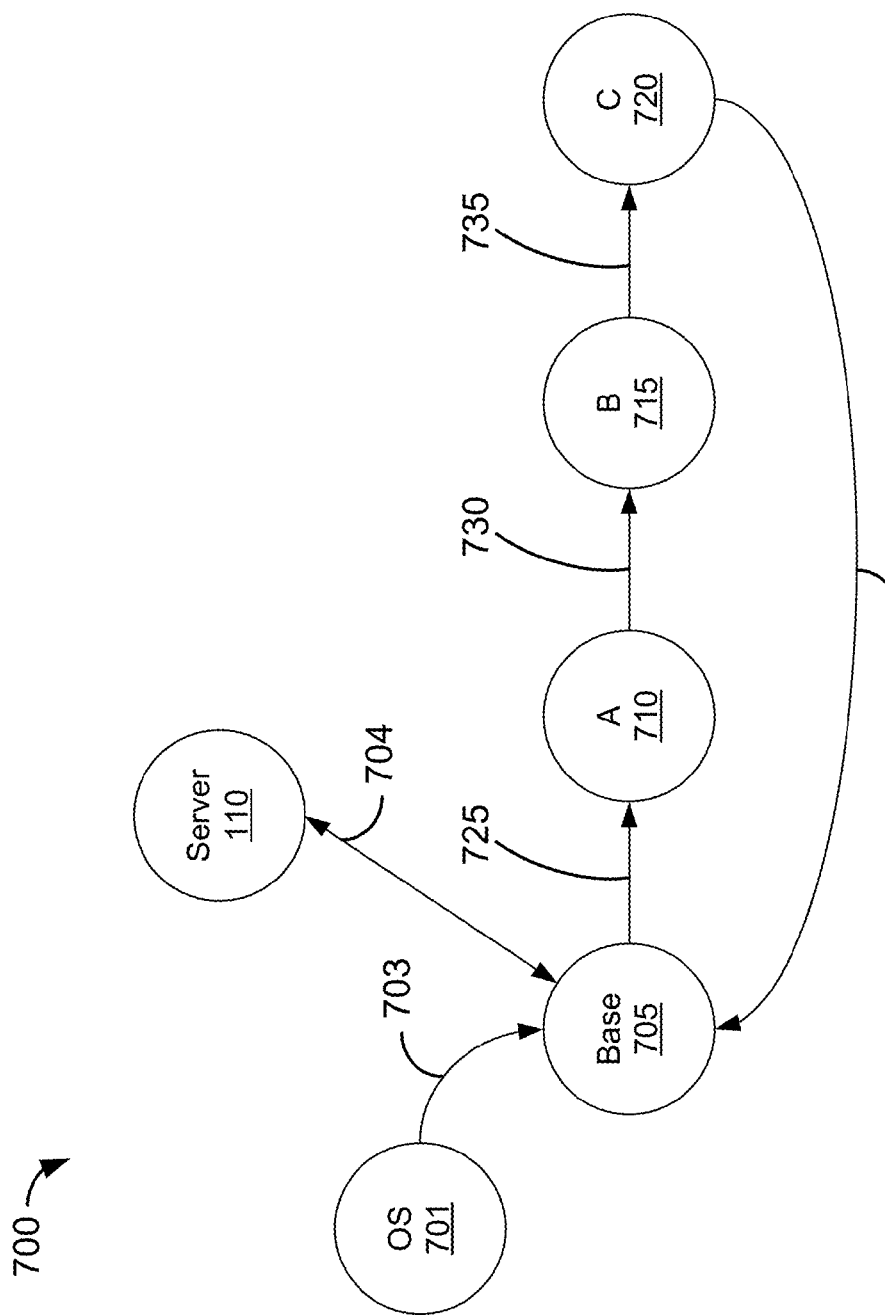
FIG. 7 shows a sequence diagram of an example of a sequence for identifying and launching applications in accordance with some implementations.

FIG. 7 shows an example of identifying and launching other applications in accordance with some implementations.

In FIG. 7, operating system 701 may launch base application 705 via transaction 703. Accordingly, base application 705 may communicate with management server 110 via transaction 704 and obtain allowable applications. Transaction 704 may be a communication associated with base application 705 requesting and obtaining data from management server 110. As an example, transaction 704 may provide the base application with allowed applications. Additionally, transaction 704 may provide data regarding how to order the allowed applications in a GUI of the base application, actions associated with the allowed applications. For example, in FIG. 7, application A 710, application B 720, and application C 730 may be indicated as allowable applications that may be launched.

In FIG. 7, application A 710 may be launched from base application 705 based on a selection in the GUI of the base application. Accordingly, data may be provided to application A 710 via transaction 725. For example, an identifier associated with the base application may be provided. Additionally, data for application A 710 to perform a particular action may be provided. For example, contextual data may be provided. For example, if application A 710 is an application that may be used to search for and display profiles on a social network (e.g., a Facebook application), contextual data indicating a person's name (e.g., John Smith) may be provided to application A 710 from base application 705. In an implementation, an action for application A 710 may also be provided. For example, an action may indicate for the Facebook application to "search" for a profile belonging to "John Smith." Any of the types of data associated with base application 705 and application A 710 disclosed throughout the disclosure may be provided. In an implementation, base application 705 and application A 710 may communicate with each other via an API.

In FIG. 7, application B 715 may next be launched, for example, from application A 710. For example, application A 710 may be a Facebook application and application B 715 may be a Twitter application. Accordingly, in transaction 730, data may be provided to application B 715 from application A 710, for example, using an API. That is, the action and contextual data related to application B 715 may be provided. For example, the action may be to "access" a Twitter profile page associated with contextual data indicating a Twitter username provided by the Facebook application. Additionally, any of the previous data from transaction 725 may also be provided. That is, the identifier information of base application 705 and application A 710 may also be provided, as well as contextual data provided to application A 710 by base application 705.

Next, application C 720 may be launched from application B 715. For example, application C 720 may be selected to be launched from application B 715. Accordingly, in transaction 735, the aforementioned data may also be passed. That is, identifier information, contextual data, and any other types of information disclosed herein may be passed to application C 720.

In transaction 740, application C 720 may return to base application 705 by using the identifier associated with base application 705 that was passed via application A 710 and application B 715. For example, a home button may be selected. That is, when the launching of application-to-application is finished, the home button may be selected to return to base application 705 by using the identifier associated with base application 705 that has been passed from application-to-application.

In some implementations, application C 720 may also provide data to base application 705 via transaction 740. As an example, base application 705 may launch application A 710, which may be a social network application (e.g., a Linkedin application), and therefore, provide a profile of an employee of a client corporation. Application B 715 may be launched from application A 710. For example, application B 715 may be a marketing application with access to records of the client corporation. Application A 710 may receive an indication to launch, for example via selection of a link or button, application B 715 and pass contextual data including the name of the client corporation or another identifying information. Accordingly, application B 715 may provide data associated with the client corporation. Next, application C 720 may be launched from application B 715. For example, application C 720 may be a sales request application, and therefore, is passed the appropriate data from application B 715. In transaction 740, the data from the sales request application may then be provided to base application 705, and for example, posted on a social network feed. For example, data including current sales numbers may be provided. As such, several applications may be launched and used until particular data is found, and because identifier information is passed via the launching of the applications, the third application may provide the data to the base application as well as allow the computing device to return to the base application.

As another example, base application 705 may include social media feed 405 including comments from users within an organization. Management server 110 may provide the allowed applications (i.e., application A 710, application B 715, and application C 720). A comment on social media feed 405, such as "We got a new client request from Pablo Delgado" may be selected and application A 710 may be launched. Several applications may be launched to navigate to a particular application. As an example, application A 710 may be a Facebook application. In application A 710, application B 715 (e.g., a Linkedin application) may be launched. In application B 715, application C 720 may be launched. Application C 720 may be a sales application. Application B 715 may indicate that application C 720 may access a sales record associated with Pablo Delgado. Accordingly, when application C 720 is launched, Pablo Delgado's sales record is available. Throughout the launching from application-to-application, identifier information associated with base application 705 may be passed, and therefore, when Pablo Delgado's sales record is accessed, information from the sales record may be passed to base application 705 identified by the identifier information, for example, when application C 720 is closed or a selection is made to return to the base application. Accordingly, the base application has access to the data (e.g., the sales record) received from application C 720. The information from the sales record may be posted on social media feed 405, for example, as a child comment nested underneath and in response to comment "We got a new client request from Pablo Delgado."

In an implementation, the features described herein with respect to the base application may be implemented in an operating system. For example, the applications that may be launched within the operating system may be also provided by a management server. The operating system may configure a GUI, for example a menu with shortcuts or icons for launching applications, based on the allowed applications provided by the management server.

Mechanisms and methods for providing systems implementing enterprise level social and business information networking are disclosed herein with reference to several implementations. Examples of database systems are described and can provide a platform for tracking events related to a record, actions of a user, and messages about a user or record. The disclosed systems support various data structures of feeds, the customization of feeds, selection of records and users to follow, generation of feeds, and display of feeds in suitable presentations on a user's display device.

Figure 8A:
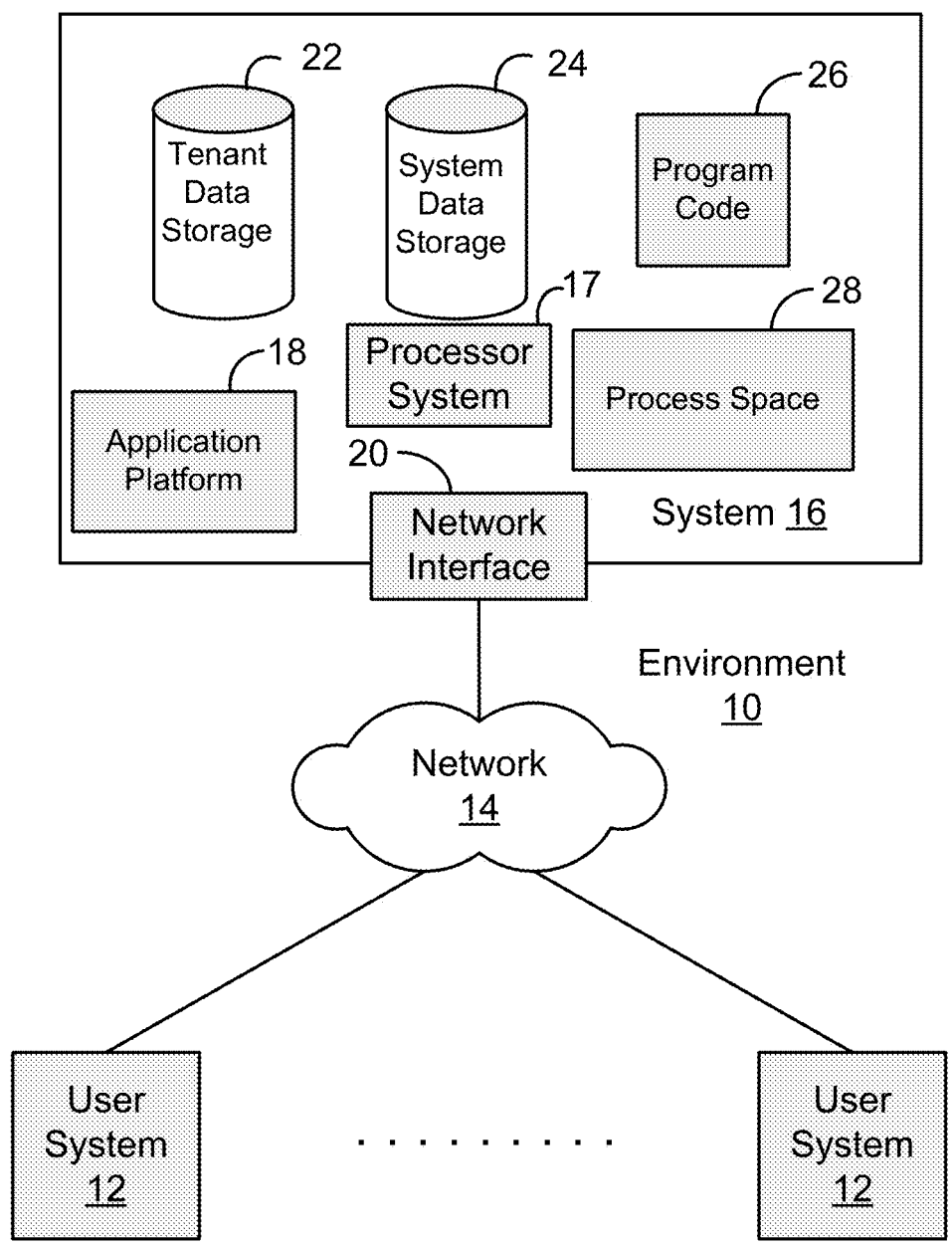
FIG. 8A shows a block diagram of an example of an environment 10 in which an on-demand database service can be used in accordance with some implementations.

FIG. 8A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
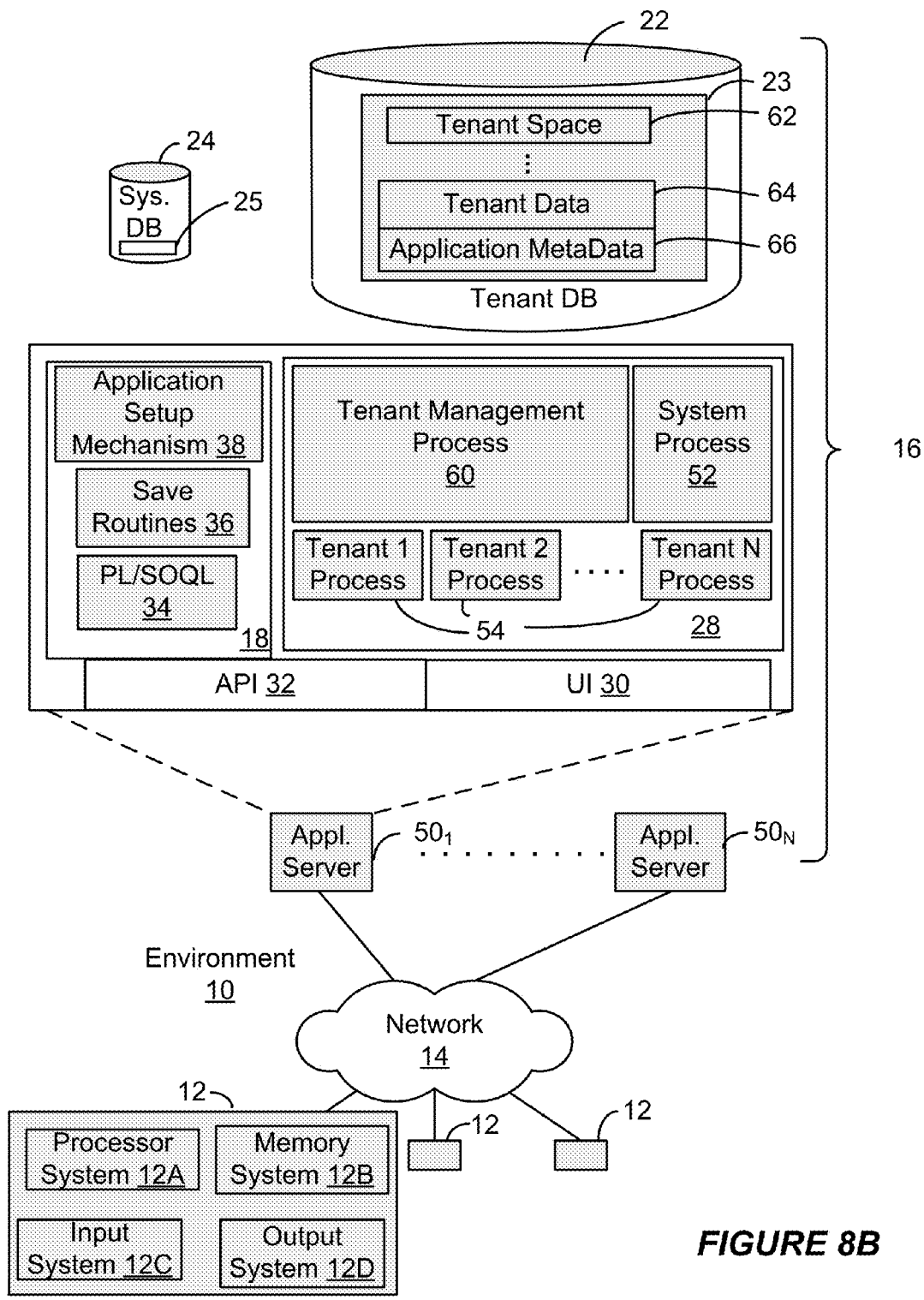
FIG. 8B shows a block diagram of an example of some implementations of elements of FIG. 8A and various possible interconnections between these elements.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
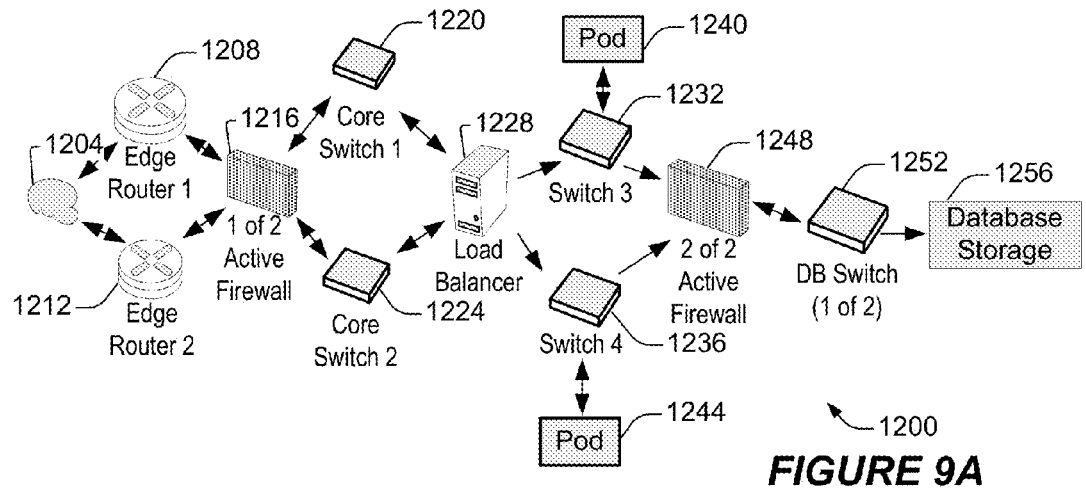
FIG. 9A shows a system diagram illustrating an example of architectural components of an on-demand database service environment 1200 according to some implementations.

FIG. 9A shows a system diagram illustrating an example of architectural components of an on-demand database service environment 1200 according to some implementations. A client machine located in the cloud 1204, generally referring to one or more networks in combination, as described herein, may communicate with the on-demand database service environment via one or more edge routers 1208 and 1212. A client machine can be any of the examples of user systems 12 described above. The edge routers may communicate with one or more core switches 1220 and 1224 via firewall 1216. The core switches may communicate with a load balancer 1228, which may distribute server load over different pods, such as the pods 1240 and 1244. The pods 1240 and 1244, which may each include one or more servers and/or other computing resources, may perform data processing and other operations used to provide on-demand services. Communication with the pods may be conducted via pod switches 1232 and 1236. Components of the on-demand database service environment may communicate with a database storage 1256 via a database firewall 1248 and a database switch 1252.

Figure 9B:
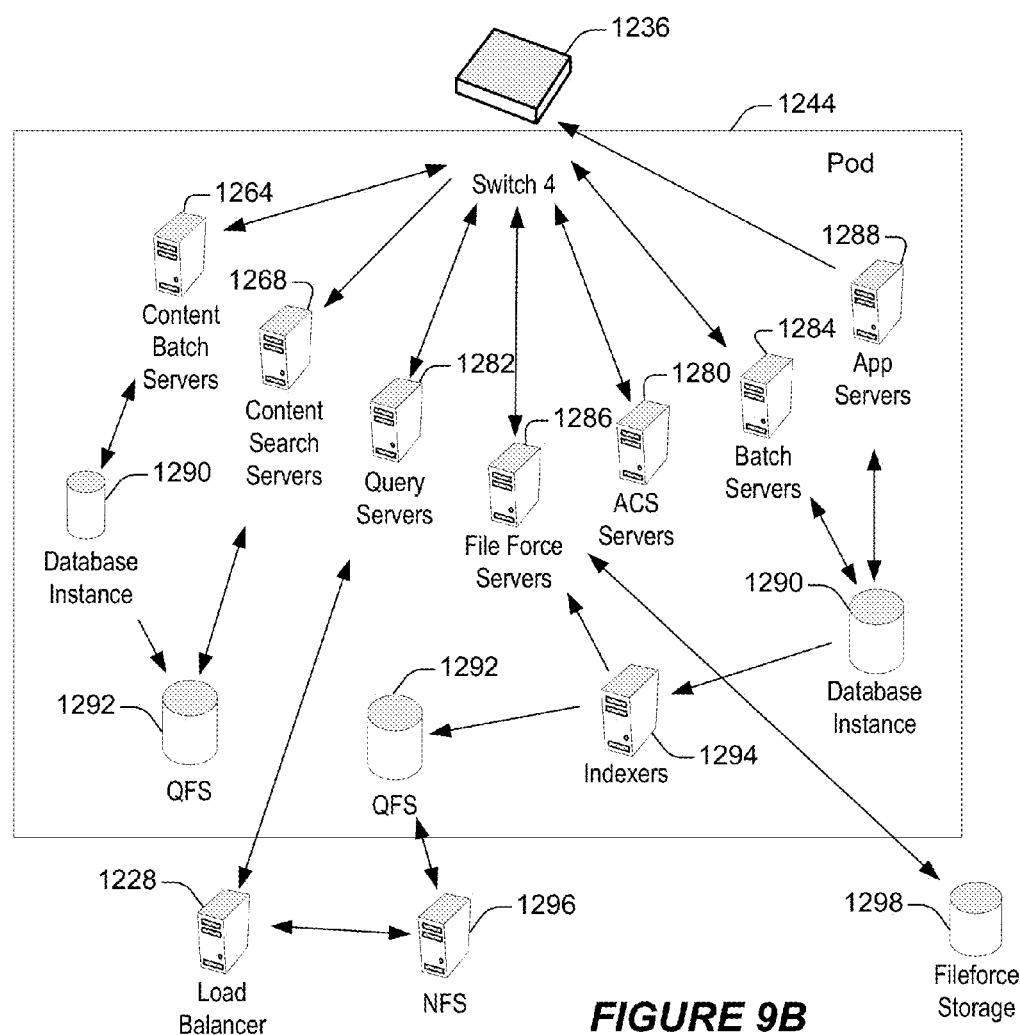
FIG. 9B shows a system diagram further illustrating an example of architectural components of an on-demand database service environment according to some implementations.

As shown in FIGS. 9A and 9B, accessing an on-demand database service environment may involve communications transmitted among a variety of different hardware and/or software components. Further, the on-demand database service environment 1200 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 1200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1204 is intended to refer to a data network or plurality of data networks, often including the Internet. Client machines located in the cloud 1204 may communicate with the on-demand database service environment to access services provided by the on-demand database service environment. For example, client machines may access the on-demand database service environment to retrieve, store, edit, and/or process information.

In some implementations, the edge routers 1208 and 1212 route packets between the cloud 1204 and other components of the on-demand database service environment 1200. The edge routers 1208 and 1212 may employ the Border Gateway Protocol (BGP). The BGP is the core routing protocol of the Internet. The edge routers 1208 and 1212 may maintain a table of IP networks or 'prefixes', which designate network reachability among autonomous systems on the Internet.

In one or more implementations, the firewall 1216 may protect the inner components of the on-demand database service environment 1200 from Internet traffic. The firewall 1216 may block, permit, or deny access to the inner components of the on-demand database service environment 1200 based upon a set of rules and other criteria. The firewall 1216 may act as one or more of a packet filter, an application gateway, a stateful filter, a proxy server, or any other type of firewall.

In some implementations, the core switches 1220 and 1224 are high-capacity switches that transfer packets within the on-demand database service environment 1200. The core switches 1220 and 1224 may be configured as network bridges that quickly route data between different components within the on-demand database service environment.

In some implementations, the use of two or more core switches 1220 and 1224 may provide redundancy and/or reduced latency.

In some implementations, the pods 1240 and 1244 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 1240 and 1244 may be conducted via the pod switches 1232 and 1236. The pod switches 1232 and 1236 may facilitate communication between the pods 1240 and 1244 and client machines located in the cloud 1204, for example via core switches 1220 and 1224. Also, the pod switches 1232 and 1236 may facilitate communication between the pods 1240 and 1244 and the database storage 1256.

In some implementations, the load balancer 1228 may distribute workload between the pods 1240 and 1244. Balancing the on-demand service requests between the pods may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248. The database firewall 1248 may act as a computer application firewall operating at the database application layer of a protocol stack. The database firewall 1248 may protect the database storage 1256 from application attacks such as structure query language (SQL) injection, database rootkits, and unauthorized information disclosure.

In some implementations, the database firewall 1248 may include a host using one or more forms of reverse proxy services to proxy traffic before passing it to a gateway router. The database firewall 1248 may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, communication with the database storage 1256 may be conducted via the database switch 1252. The multi-tenant database storage 1256 may include more than one hardware and/or software components for handling database queries. Accordingly, the database switch 1252 may direct database queries transmitted by other components of the on-demand database service environment (e.g., the pods 1240 and 1244) to the correct components within the database storage 1256.

In some implementations, the database storage 1256 is an on-demand database system shared by many different organizations. The on-demand database system may employ a multi-tenant approach, a virtualized approach, or any other type of database approach. An on-demand database system is discussed in greater detail with reference to FIGS. 8A and 8B.

FIG. 9B shows a system diagram further illustrating an example of architectural components of an on-demand database service environment according to some implementations. The pod 1244 may be used to render services to a user of the on-demand database service environment 1200. In some implementations, each pod may include a variety of servers and/or other systems. The pod 1244 includes one or more content batch servers 1264, content search servers 1268, query servers 1282, file force servers 1286, access control system (ACS) servers 1280, batch servers 1284, and app servers 1288. Also, the pod 1244 includes database instances 1290, quick file systems (QFS) 1292, and indexers 1294. In one or more implementations, some or all communication between the servers in the pod 1244 may be transmitted via the switch 1236.

In some implementations, the app servers 1288 may include a hardware and/or software framework dedicated to the execution of procedures (e.g., programs, routines, scripts) for supporting the construction of applications provided by the on-demand database service environment 1200 via the pod 1244. In some implementations, the hardware and/or software framework of an app server 1288 is configured to execute operations of the services described herein, including performance of the blocks of methods described with reference to FIGS. 1-7. In alternative implementations, two or more app servers 1288 may be included and cooperate to perform such methods, or one or more other servers described herein can be configured to perform the disclosed methods.

The content batch servers 1264 may handle requests internal to the pod. These requests may be long-running and/or not tied to a particular customer. For example, the content batch servers 1264 may handle requests related to log mining, cleanup work, and maintenance tasks.

The content search servers 1268 may provide query and indexer functions. For example, the functions provided by the content search servers 1268 may allow users to search through content stored in the on-demand database service environment.

The file force servers 1286 may manage requests for information stored in the Fileforce storage 1298. The Fileforce storage 1298 may store information such as documents, images, and basic large objects (BLOBs). By managing requests for information using the file force servers 1286, the image footprint on the database may be reduced.

The query servers 1282 may be used to retrieve information from one or more file systems. For example, the query system 1282 may receive requests for information from the app servers 1288 and then transmit information queries to the NFS 1296 located outside the pod.

The pod 1244 may share a database instance 1290 configured as a multi-tenant environment in which different organizations share access to the same database. Additionally, services rendered by the pod 1244 may call upon various hardware and/or software resources. In some implementations, the ACS servers 1280 may control access to data, hardware resources, or software resources.

In some implementations, the batch servers 1284 may process batch jobs, which are used to run tasks at specified times. Thus, the batch servers 1284 may transmit instructions to other servers, such as the app servers 1288, to trigger the batch jobs.

In some implementations, the QFS 1292 may be an open source file system available from Sun Microsystems® of Santa Clara, Calif. The QFS may serve as a rapid-access file system for storing and accessing information available within the pod 1244. The QFS 1292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1268 and/or indexers 1294 to identify, retrieve, move, and/or update data stored in the network file systems 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information to access files over a network in a manner similar to how local storage is accessed.

In some implementations, queries from the query servers 1222 may be transmitted to the NFS 1296 via the load balancer 1228, which may distribute resource requests over various resources available in the on-demand database service environment. The NFS 1296 may also communicate with the QFS 1292 to update the information stored on the NFS 1296 and/or to provide information to the QFS 1292 for use by servers located within the pod 1244.

In some implementations, the pod may include one or more database instances 1290. The database instance 1290 may transmit information to the QFS 1292. When information is transmitted to the QFS, it may be available for use by servers within the pod 1244 without using an additional database call.

In some implementations, database information may be transmitted to the indexer 1294. Indexer 1294 may provide an index of information available in the database 1290 and/or QFS 1292. The index information may be provided to file force servers 1286 and/or the QFS 1292.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer implemented method for managing applications on a computing device, the method comprising:

receiving, at the computing device, allowed application data including a list of one or more launchable applications a user is authorized to access that are capable of being launched by a base application on the computing device, the allowed application data comprising a display priority of the one or more launchable applications according to usage information of the one or more launchable applications, the base application including a social media feed, the one or more launchable applications associated with partners of an organization to which the user belongs, and the one or more launchable applications determined based on at least credentials of the user;

causing display at the computing device of a user interface comprising one or more selections of the one or more launchable applications;

receiving, at the computing device, first input data indicating a selection of a first application of the one or more launchable applications;

providing, to the first application, identifier data identifying the base application and first selection data associated with the selection of the first application, the first selection data comprising contextual data from the social media feed, the contextual data providing one or more variables for performing an action associated with the first application, the action comprising at least a search for and retrieval of content within the first application and different from controlling access to content;

processing, at the computing device, first application data provided by the first application, the first application data comprising social media data capable of being shared on the social media feed, the social media data retrieved as a result of the action associated with the first application; and causing display at the computing device of the first application data.

2. The method of claim 1, further comprising:

receiving, at the computing device, second input data indicating a selection of a second application of the one or more launchable applications; and providing, to the second application, the identifier data identifying the base application, the first selection data associated with the selection of the first application, and second selection data associated with the selection of the second application.

3. The method of claim 2, the method further comprising:

receiving, at the computing device, an indication to return to the base application from the second application; and returning to the base application from the second application, the return based on the identifier data identifying the base application.

4. The method of claim 1, wherein the allowed application data further identifies allowed actions performed by the one or more launchable applications.

5. The method of claim 1, wherein the one or more launchable applications are further determined based on a role of a user in an organization.

6. The method of claim 1, wherein the one or more launchable applications are further determined based on a geographic region.

7. The method of claim 1, wherein the computing device is one of: a smartphone, a laptop, a tablet, a wearable display device, and a desktop computer.

8. One or more computing devices for using applications, the one or more computing devices comprising:

one or more hardware processors configurable to cause:

processing allowed application data including a list of one or more launchable applications a user is authorized to access that are capable of being launched by a base application on a computing device, the allowed application data comprising a display priority of the one or more launchable applications according to usage information of the one or more launchable applications, the base application including a social media feed, the one or more launchable applications associated with partners of an organization to which the user belongs, and the one or more launchable applications determined based on at least credentials of the user;

displaying, at a display of the computing device, a user interface comprising one or more selections of the one or more launchable applications;

processing first input data indicating a selection of a first application of the one or more launchable applications;

providing, to the first application, identifier data identifying the base application and first selection data associated with the selection of the first application, the first selection data comprising contextual data from the social media feed, the contextual data providing one or more variables for performing an action associated with the first application, the action comprising at least a search for and retrieval of content within the first application and different from controlling access to content;

processing first application data provided by the first application, the first application data comprising social media data capable of being shared on the social media feed, the social media data retrieved as a result of the action associated with the first application; and displaying, at the display of the computing device, the first application data.

9. The one or more computing devices of claim 8, the one or more processors further configurable to cause:

processing second input data indicating a selection of a second application of the one or more launchable applications; and providing, to the second application, the identifier data identifying the base application, the first selection data associated with the selection of the first application, and second selection data associated with the selection of the second application.

10. The one or more computing devices of claim 9, the one or more processors further configurable to cause:

processing an indication to return to the base application from the second application; and returning to the base application from the second application, the returning based on the identifier data identifying the base application.

11. The one or more computing devices of claim 8, wherein the allowed application data further identifies allowed actions performed by the one or more launchable applications.

12. The one or more computing devices of claim 8, wherein the one or more launchable applications are further determined based on a role of a user in an organization.

13. The one or more computing devices of claim 8, wherein the one or more launchable applications are further determined based on a geographic region.

14. A non-transitory computer readable medium having instructions stored thereon, the instructions being executable by a processor and being configurable to cause:

processing allowed application data including a list of one or more launchable applications a user is authorized to access that are capable of being launched by a base application on a computing device, the allowed application data comprising a display priority of the one or more launchable applications according to usage information of the one or more launchable applications, the base application including a social media feed, the one or more launchable applications associated with partners of an organization to which the user belongs, and the one or more launchable applications determined based on at least credentials of the user;

displaying, at a display of the computing device, a user interface comprising one or more selections of the one or more launchable applications;

processing first input data indicating a selection of a first application of the one or more launchable applications;

providing, to the first application, identifier data identifying the base application and first selection data associated with the selection of the first application, the first selection data comprising contextual data from the social media feed, the contextual data providing one or more variables for performing an action associated with the first application, the action comprising at least a search for and retrieval of content within the first application and different from controlling access to content;

processing first application data provided by the first application, the first application data comprising social media data capable of being shared on the social media feed, the social media data retrieved as a result of the action associated with the first application; and displaying, at the display of the computing device, the first application data.

15. The non-transitory computer readable medium of claim 14, the instructions being further configurable to cause:

processing second input data indicating a selection of a second application of the one or more launchable applications; and providing, to the second application, identifier data identifying the base application, the first selection data associated with the selection of the first application, and second selection data associated with the selection of the second application.

* * * * *